July 16, 1935. C. E. ROWE Re. 19,648
APPARATUS FOR REMOVING BOOTS AND SHOES FROM LASTS
Original Filed Jan. 11, 1932
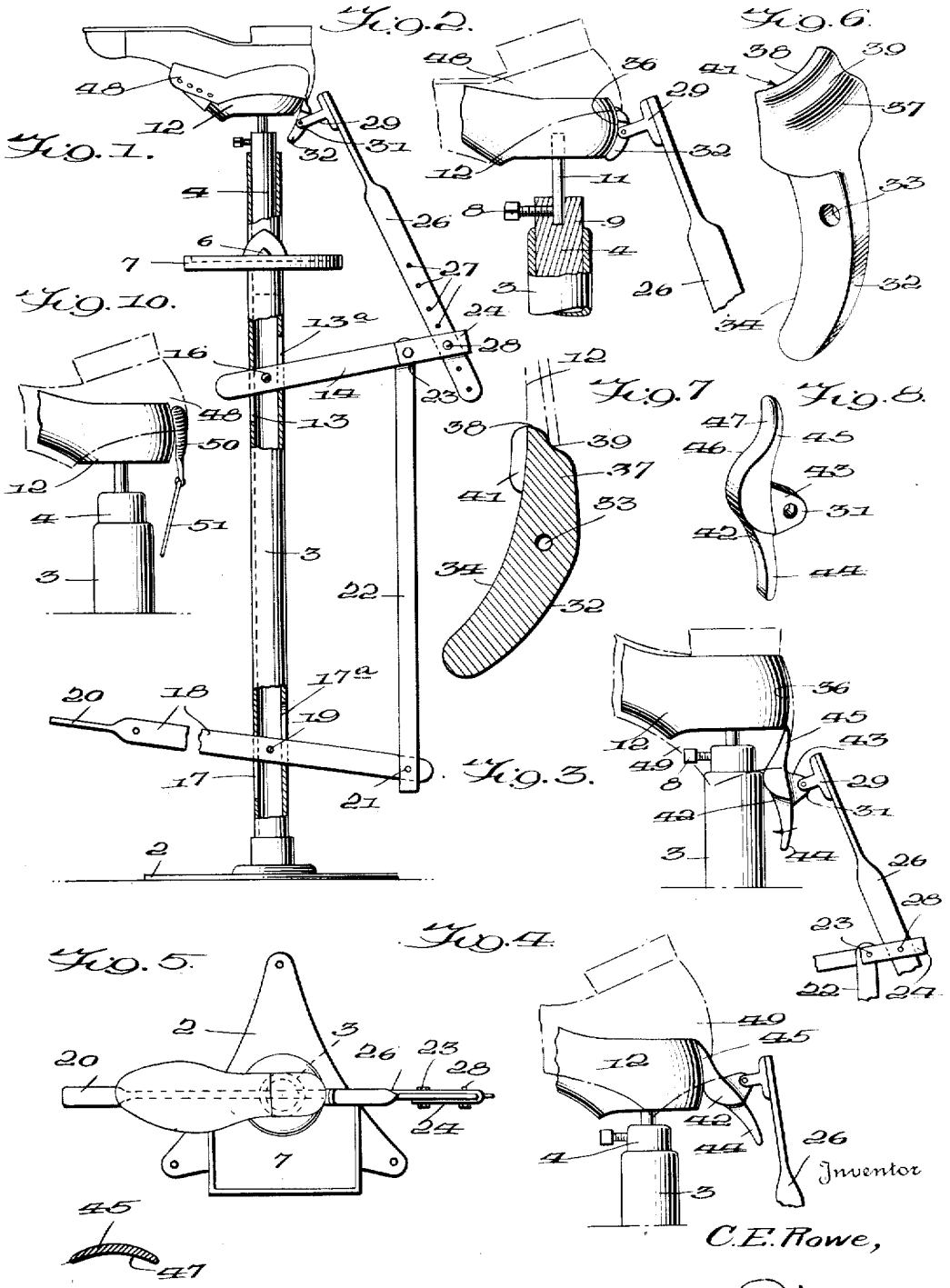

Reissued July 16, 1935 Re. 19,648

UNITED STATES PATENT OFFICE 19,648

APPARATUS FOR REMOVING BOOTS AND SHOES FROM LASTS

Charles Edward Rowe, Ballarat, Victoria, Australia, assignor of one-fourth to Robert Andrew Graham and one-fourth to James Irving Graham, both of Ballarat, Victoria, Australia Original No. 1,938,465, dated December 5, 1933, Serial No. 586,022, January 11, 1932, and in Australia August 19, 1931. Application for reissue October 29, 1934, Serial No. 750,604

33 Claims. (Cl. 12—15.1)

This invention relates to the manufacture of boots and shoes and refers more particularly to the removal of the boot or shoe from the last upon which it is built up. The invention may also be applied if so desired to the operation of refitting the boot or shoe to the last for subsequent treatment.

Hitherto such operations of removing the built up boots or shoes from their lasts have usually been effected by hand, the toe of the shoe being pressed against the breast of the operator whilst the heel portion is pulled upwardly over the last. This hand operation calls for considerable effort and discomfort on the part of the operator and entails excessive expense in time and labor.

Accordingly, one of the objects of the present invention contemplates the provision of improved apparatus of simple and inexpensive construction, which may be easily operated by relatively unskilled labor, which greatly facilitates the operations referred to and which is designed to minimize the effort required by the operator and to perform the operation of removing the shoe or boot from its last by semi-automatic means which will take the place of the hand operation previously utilized.

Devices have been proposed to perform mechanically the operations referred to, but such devices have proved only partially satisfactory.

Other objects of this invention aim to avoid the deficiencies of such known mechanical devices by providing means for insuring that the operating tool, when removing the shoe, follows the curved back portion of the last by moving in an arc substantially conforming to the back line curvature thereof, by providing means for exerting a pressure against the counter portion of a shoe while passing through its arc of movement, and by providing means adapted to enter between the curved rear portion of the last and the inside of the shoe, thereby to separate the last and shoe while exerting a pressure against the shoe in removing same from its last.

Still another object contemplates an apparatus which may be adapted to re-apply boots and shoes to their lasts.

To the attainment of the foregoing and other objects which will appear as the description proceeds, reference may be made to the accompanying drawing, in which:—

Fig. 1 is a part sectional side elevation of an apparatus or machine in accordance with the invention and showing a shoe removing attachment as it engages the heel portion of a shoe upper on the last;

Fig. 2 is an enlarged fragmentary view partly in section illustrating the shoe removing attachment in action and the shoe partly removed from the last;

Fig. 3 is a fragmentary view showing a modified boot removing attachment applied to the machine and indicating the manner in which such attachment is used to stretch the rear part of the boot upper outwardly preparatory to forcing the boot upwardly over the last;

Fig. 4 is another fragmentary view of the arrangement shown in Fig. 3 indicating the relative position of the parts when the boot is partly removed from the last;

Fig. 5 is a plan of Fig. 1;

Fig. 6 is an enlarged perspective view of the shoe removing attachment seen in Figs. 1 and 2;

Fig. 7 is an enlarged sectional view of the attachment seen in Fig. 6;

Fig. 8 is an enlarged perspective view of the boot removing attachment or hand lever seen in Figs. 3 and 4;

Fig. 9 is a cross section of the upper portion of the attachment or lever shown in Fig. 8; and Fig. 10 illustrates how the machine may be used for re-applying boots or shoes to their lasts.

Apparatus in accordance with the invention includes a stand or pedestal preferably comprising a base 2 and a tubular standard 3, into the open upper end of which is fitted a shank 4 which may be secured to the standard 3 by means of a bolt 6 or the like passing therethrough and serving also to detachably secure a tool tray 7 to said standard.

Held by a set screw 8 within a recess 9 at the top of the shank 4 is a last post, or as it is sometimes called last pin 11, onto which the last 12 may be removably fitted in an inverted position, as shown.

Passing through opposite vertical slots 13, 13a in the standard 3 is an arm or lever 14 which is pivoted at 16 to the standard. As seen in Fig. 1 this arm may normally engage the ends of the slots 13, 13a so that these ends act as stops to limit the downward movement of the arm 14 about its pivot 16.

Formed in the lower part of the standard 3 are opposite vertical slots 17, 17a through which passes a foot lever 18 which is intermediately pivoted at 19 to the standard and may normally engage the ends of the slots 17, 17a as seen in Fig. 1. One end of this foot lever is provided with a treadle portion 20 and its other end is pivoted at 21 to the lower end of a link 22, the upper end of which is pivoted at 23 to the arm 14.

The outer or rear end portion of the arm 14 may be bent back upon itself as indicated at 24 in Figs. 1 and 6 to freely accommodate a push rod or floating arm 26 which is provided with adjusting holes 27 to receive a removable pivot pin 28 whereby the rod 26 is adjustably pivoted to the outer end portion of the arm 14. In the preferred embodiment illustrated (Fig. 1) it will be observed that the rod or arm 26 is supported as well as actuated by the pivoted lever 14.

Secured to the upper end of the push rod 26 is a bearing bracket 29 carrying a removable pivot pin 31 by which a shoe removing attachment or a boot removing attachment may be detachably pivoted to the bracket 29 as hereinafter described.

The arrangement of elements just described provides a system of links and levers by means of which power applied to the treadle 20, may be translated into a direct force effective to apply pressure to the shoe through the medium of the shoe removing attachment or tool, with a minimum of effort on the part of the operator.

The shoe removing attachment which is illustrated in Figs. 1, 2, 6 and 7, consists of a pawl-like member 32 having an intermediate pivot pin hole 33 to receive the pivot 31. The front face of this pawl-like member is longitudinally curved as at 34 to conform substantially to the curvature in a vertical plane of the rear heel surface 36 of the last 12. The upper end of the pawl-like member 32 is provided with a head 37 having a relatively thin upper edge, nose or lip, indicated at 38, which may be formed by a transverse groove or recess 39 in the upper face of the head 37, leaving a shoulder rearwardly of and below the thin edge. In addition to its longitudinal curvature the front face of the head 37 is transversely curved in concave form as indicated at 41 to conform substantially to the transverse curvature of the last surface 36.

The lip 38 performs an important function in the removal of the shoe from its last, in that it is designed for insertion between the inside of the counter portion of the shoe and the curved heel portion of the last for the purpose of separating the shoe and last as pressure is applied in an upward direction to the tool, whereby the shoe is pushed off of the last.

In operation the last carrying the boot or shoe is attached in an inverted position to the pin 11, and, if a shoe is to be removed from the last the pawl-like attachment 32 is pivoted to the bracket 29 on the push rod 26. The relatively thin upper edge or nose 38 of the member 32 is then entered beneath the edge of the heel portion of the shoe upper 48 and the treadle 20 is depressed, causing the shoe to be forced upwardly over the last, by the joint action of the thin edge, and the shoulder on the head 37 engaging the edge of the shoe upper, as indicated in Figs. 2 and 7. It will be here noted that owing to the pivotal mounting of the member 32 and the curvature of its front face, this member will engage and automatically follow the curvature of the rear surface 36 of the last as the pawl-like member moves upwardly with the shoe which is thus slipped over the last without liability of the pawl-like member catching against or damaging the shoe or the last.

The modified tool or attachment which is shown in Figs. 3, 4 and 8 is particularly designed for removing boots, as distinguished from shoes, although it will operate on shoes, and is in the form of a short hand lever 42 having an intermediate rearwardly projecting lug 43 provided with a hole to receive the removable pivot pin 31 whereby the attachment is connected to the bracket 29. The lower portion of this hand lever forms a handle or finger grip 44 whilst the upper portion 45 of the lever is provided with a longitudinally curved front face 46 adapted to conform substantially to the curvature upwardly, or in a vertical plane, of the last heel surface 36. This upper front face of the hand lever 42 is also curved transversely in concave form as indicated at 47 in Figs. 8 and 9.

It will be observed that the tool or attachment 42 differs from the tool 32 in that the thinned operating edge portion is considerably longer in length than the corresponding edge 38 of the tool 32, to facilitate operations upon the deeper or higher upper of a boot, as distinguished from a shoe. Furthermore, this edge portion is not backed up by a shoulder for engaging the edge portion of the upper, in view of the fact that the intermediate rearwardly projecting lug 43 will function as an equivalent.

In both forms of tool, however, the thin edge or lip will function to enter between a last and the article of footwear which is to be removed therefrom, and another portion of the tool will act to strip the article which is already partially separated by the lip, from the last.

In removing a boot from its last, which is usually a more difficult operation than that of removing a shoe, the hand lever attachment 42 is pivoted to the bracket 29 in place of the member 32 and the upper portion 45 of this lever is entered into the boot upper 49. By the operator pulling the handle 44 forwardly and thus causing the upper portion 45 to move rearwardly as indicated by the arrows in Fig. 3, the rear part of the boot upper 49 is stretched or forced rearwardly as indicated in broken lines in Fig. 3 so that it will clear the heel portion of the last as the boot is pushed off the latter. Whilst still holding the handle 44, the treadle 20 is operated causing the lever 42 to move upwardly, thereby forcing the boot up over the last. It will be evident that the curved front face of the upper portion 46 of the hand lever will follow the rear contour of the last in a similar manner to that described with reference to the pawl-like member 32 and that as the hand lever 42 moves upwardly in engagement with the last and the boot is partially removed, the operator's grip on the handle 44 may be released, and the upward movement of the lever will complete the boot removing operation.

The extreme upper edge of the portion 45 is made thin so that it will function in the same manner as the lip or nose 38 of the element 32.

The adjusting holes 27 in the push rod or floating lever 26 enable the latter to be raised or lowered in relation to its supporting and actuating arm 14 to suit requirements and to conveniently arrange the upper end of the push rod for use with the attachments 32 or 42 as the case may be.

As seen in Fig. 10, the invention may be utilized also for the purpose of re-applying a boot or shoe to its last. To this end a shoe horn or like attachment 50 may be connected by a strap or other suitable connection 51 to the front portion of the foot lever 18 so that by entering the attachment 50 between the heel portion of the boot or shoe upper and the last and depressing the treadle 20 so as to exert a downward pull on the connection 51, the grip of the shoe horn or the like 50 upon the shoe will cause the latter to be pulled downwardly over the last.

Having thus described my invention, what I claim as new and desire to secure by Letters Patent of the United States, is:—

1. In apparatus for the purpose indicated the combination of a pedestal or support adapted to hold a boot or shoe last in an inverted position, a push rod associated with said support, a member for directly cooperating with and removing the boot or shoe, said member being pivotally connected to the upper end of said rod, and means for operating said rod whereby the latter is forced upwardly with said pivoted member whilst the latter engages and forces the rear or heel portion of a boot or shoe upper from the last mounted on said support.

2. In apparatus for the purpose indicated the combination of a pedestal or support adapted to hold a boot or shoe last in an inverted position, a push rod associated with said support, a member for directly cooperating with and removing the boot or shoe, said member being pivotally connected to the upper end of said rod, and means for operating said rod whereby the latter is forced upwardly with said pivoted member whilst the latter engages and forces the rear or heel portion of a boot or shoe upper from the last mounted on said support, said pivoted boot or shoe removing member being adapted to follow the upward curvature of the rear surface of the last as the said pivoted member is forced upwardly in engagement with said surface.

3. In apparatus for the purpose indicated the combination of a pedestal or support adapted to hold a boot or shoe last in an inverted position, a push rod associated with said support, a member for directly cooperating with and removing the boot or shoe, said member being pivotally connected to the upper end of said rod, and means for operating said rod whereby the latter is forced upwardly with said pivoted member whilst the latter engages and forces the rear or heel portion of a boot or shoe upper from the last mounted on said support, said pivoted member having a front face which is longitudinally curved to conform substantially to the curvature of the rear surface of the last.

4. In apparatus for the purpose indicated the combination of a pedestal or support adapted to hold a boot or shoe last in an inverted position, a push rod associated with said support, a member for directly cooperating with and removing the boot or shoe, said member being pivotally connected to the upper end of said rod, and means for operating said rod whereby the latter is forced upwardly with said pivoted member whilst the latter engages and forces the rear or heel portion of a boot or shoe upper from the last mounted on said support, said pivoted member having a front face which is longitudinally curved to conform substantially to the curvature of the rear surface of the last, said longitudinally curved front face being also curved transversely in concave formation.

5. In appartus for the purpose indicated the combination of a pedestal or support adapted to hold a boot or shoe last in an inverted position, a push rod associated with said support, a member for directly cooperating with and removing the boot or shoe, said member being pivotally connected to the upper end of said rod, and means for operating said rod whereby the latter is forced upwardly with said pivoted member whilst the latter engages and forces the rear or heel portion of a boot or shoe upper from the last mounted on said support, said pivoted member consisting of a pawl-like attachment intermediately pivoted to said push rod, said attachment having a relatively thin upper edge or nose for insertion between the boot or shoe and last.

6. In apparatus for the purpose indicated the combination of a pedestal or support adapted to hold a boot or shoe last in an inverted position, a push rod associated with said support, a member for directly cooperating with and removing the boot or shoe, said member being pivotally connected to the upper end of said rod, and means for operating said rod whereby the latter is forced upwardly with said pivoted member whilst the latter engages and forces the rear or heel portion of a boot or shoe upper from the last mounted on said support, said pivoted member consisting of a pawl-like attachment intermediately pivoted to said push rod, said pawl-like member being provided at its upper end with a head having a relatively thin upper edge or nose for insertion between the boot or shoe and last, and a transversey curved front face.

7. In apparatus for the purpose indicated the combination of a pdesetal or support adapted to hold a boot or shoe last in an inverted position, a push rod associated with said support, a member for directly cooperating with and removing the boot or shoe, said member being pivotally connected to the upper end of said rod, and means for operating said rod whereby the latter is forced upwardly with said pivoted member whilst the latter engages and forces the rear or heel portion of a boot or shoe upper from the last mounted on said support, said pivoted member consisting of a hand lever, the lower portion of which forms a handle or finger grip whilst the upper portion thereof is adapted to enter and engage the rear part of a boot upper.

8. In apparatus for the purpose indicated the combination of a pedestal or support adapted to hold a boot or shoe last in an inverted position, a push rod associated with said support, a member for directly cooperating with and removing the boot or shoe, said member being pivotally connected to the upper end of said rod, and means for operating said rod whereby the latter is forced upwardly with said pivoted member whilst the latter engages and forces the rear or heel portion of a boot or shoe upper from the last mounted on said support, said pivoted member consisting of a hand lever, the upper portion of which is provided with a longitudinally curved front face adapted to conform substantially to the upward curvature of the rear surface of the last, whilst the lower portion of said hand lever forms a handle or finger grip.

9. In apparatus for the purpose indicated the combination of a pedestal or support adapted to hold a boot or shoe last in an inverted position, a push rod associated with said support, a member for directly cooperating with and removing the boot or shoe, said member being pivotally connected to the upper end of said rod, and means for operating said rod whereby the latter is forced upwardly with said pivoted member whilst the latter engages and forces the rear or heel portion of a boot or shoe upper from the last mounted on said support, said pivoted member consisting of a hand lever, the upper portion of which is provided with a longitudinally curved front face adapted to conform substantially to the upward curvature of the rear surface of the last, whilst the lower portion of said hand lever forms a handle or finger grip, said longitudinally curved front face being also transversely curved in concave formation.

10. In apparatus for the purpose indicated the combination of a pedestal or support adapted to hold a boot or shoe last in an inverted position, a push rod pivotally associated with said support, a member for directly cooperating with and removing the boot or shoe, said member being pivotally connected to the upper end of said rod, and means for operating said rod whereby the latter is forced upwardly with said pivoted member whilst the latter engages and forces the rear or heel portion of a boot or shoe upper from the last mounted on said support, and means for longitudinally adjusting said push rod in relation to its pivotal support.

11. In apparatus for the purpose indicated the combination of a pedestal or support adapted to hold a boot or shoe last in an inverted position, a push rod associated with said support, a member for directly cooperating with and removing the boot or shoe, said member being pivotally connected to the upper end of said rod, and means for operating said rod whereby the latter is forced upwardly with said pivoted member whilst the latter engages and forces the rear or heel portion of a boot or shoe upper from the last mounted on said support, said push rod being provided at its upper end with a bracket adapted for detachable pivotal connection to said boot or shoe removing member.

12. In apparatus for removing boots or shoes from their lasts, an inverted last for receiving a boot upper, a standard for supporting the last, and a pivotally mounted member consisting of an intermediately pivoted hand lever carried by the standard, the lower portion of which forms a handle or finger grip, whilst the upper portion of said lever is provided with a curved front face and is adapted to enter the rear portion of a boot upper on an inverted last for the purpose specified.

13. In an apparatus for removing boots or shoes from their lasts, a support for receiving a last with a boot or shoe upper thereon, a pivotally mounted boot or shoe removing tool associated with said support, and means to actuate said tool, said tool consisting of an intermediately pivoted hand lever carried by the support, and having a lower portion which forms a handle or finger grip, and an upper portion which is provided with a lip positioned to enter the rear portion of the upper on the last, and effective to separate the upper from the last.

14. In an apparatus for removing a boot or shoe from its last, the combination of a support, a last post carried thereby for receiving a last having a boot or shoe mounted thereon, a boot or shoe removing tool mounted for movement relative to said support, means to actuate said tool, and adjustable means for controlling the movement of said tool, effective to vary the operative movement of said tool with respect to its actuating means.

15. In an apparatus for removing a boot or shoe from its last, the combination of a support, a last post carried thereby for receiving a last having a boot or shoe mounted thereon, a boot or shoe removing tool mounted for movement relative to said support, means to actuate said tool, said tool having a lip shaped to conform substantially to the curvature of the heel portion of the last, and adapted for insertion between the shoe and last, adjustable means for controlling the movement of said tool, effective to vary the operative movement of said tool with respect to its actuating means.

16. A machine for removing shoes from lasts comprising a support for a last with a shoe thereon, a shoe removing tool having a portion engageable with the shoe and a lip adapted for insertion between the shoe and the last, means for moving said tool while in engagement with the shoe through an operating stroke effective to remove the shoe from the last, and adjustable means connecting said tool to said support, for controlling the position of said tool during said operating stroke, effective to vary the operative movement of said tool with respect to its actuating means.

17. A machine for removing shoes from lasts comprising a support for a last with a shoe thereon, a shoe removing tool having a portion engageable with the shoe and a lip adapted for insertion between the shoe and the last, means for moving said tool while in engagement with the shoe through an arcuate path of movement conforming generally to the line of curvature of the heel portion of the last, including means connecting said tool to said support, for controlling the position of said tool during said operating stroke, and effective to vary the operative movement of said tool with respect to its actuating means.

18. A machine for removing shoes from lasts comprising a support for a last with a shoe thereon, a shoe removing tool having a portion engageable with the shoe and a lip adapted for insertion between the shoe and the last, means pivotally connected to said tool for moving said tool through an arcuate path of movement conforming generally to the line of curvature of the heel portion of the last, including means connecting said tool to said support, for controlling the position of said tool during its movement, and effective to vary the operative movement of said tool with respect to its actuating means.

19. A machine for removing shoes from lasts comprising a support for a last with a shoe thereon, a shoe removing tool having a shoulder engageable with an edge of the shoe and a lip adapted for insertion between the shoe and the last, said lip merging into a concave operating surface, the concavity of which conforms substantially to the convexity of the heel portion of the last, means for moving said tool while in engagement with the shoe through an operating stroke effective to remove the shoe from the last, and means connecting said tool to said support, whereby to control the position of said tool, during said operating stroke.

20. A machine for removing shoes from lasts comprising a support for a last with a shoe thereon, a shoe removing tool having an abutment engageable with an edge of the shoe and a lip adapted for insertion between the shoe and the last, said lip merging into a concave operating surface, the concavity of which conforms substantially to the convexity of the heel portion of the last, means for actuating said tool while in engagement with the shoe through an operating stroke effective to remove the shoe from the last, said tool being pivotally connected to said actuating means, whereby it will follow the line of curvature of the heel portion of the last during said operating stroke.

21. A machine for removing shoes from lasts, comprising a support for lasts with a shoe thereon, a shoe removing tool having an extended edge portion shaped like a shoe horn and adapted for insertion between the heel portion of the shoe and the last, said horn shaped portion merging into a shouldered portion adapted for engagement with the upper edge of the shoe, means for moving said tool into engagement with the shoe and last and for thereafter moving said tool further in the same general direction, to effect a removal of the shoe from the last.

22. A machine for removing shoes from lasts, comprising a support for lasts with a shoe thereon, a shoe removing tool having an extended edge portion shaped like a shoe horn, and adapted for insertion between the heel portion of the shoe and the last, said horn shaped portion merging into a shouldered portion adapted for engagement with the upper edge of the shoe, and said tool having an operating face concaved laterally and longitudinally to conform substantially to the contour of the heel portion of a last, means for moving said tool into engagement with the shoe and last, and for thereafter moving said tool further in the same general direction to effect a removal of the shoe from the last.

23. A machine for removing shoes from lasts, comprising a support for lasts with a shoe thereon, a shoe removing tool having an extended edge portion shaped like a shoe horn and adapted for insertion between the heel portion of the shoe and the last, said horn shaped portion merging into a shouldered portion adapted for engagement with the upper edge of the shoe, and said tool having an operating face concaved laterally and longitudinally to conform substantially to the contour of the heel portion of a last, means pivotally connected to said tool for moving said tool into engagement with the shoe and last, and for thereafter moving said tool further in the same general direction to effect a removal of the shoe from the last.

24. A machine for removing shoes from lasts comprising a support for a last with a shoe thereon, a shoe removing tool having a shoulder engageable with an edge of the shoe and a lip adapted for insertion between the shoe and the last, said lip merging into a concave operating surface, the concavity of which conforms substantially to the convexity of the heel portion of the last, and means for moving said tool while in engagement with the shoe through an operating stroke effective to remove the shoe from the last.

25. In apparatus for removing boots or shoes from their lasts, the combination of a pedestal or support adapted to hold a last in an inverted position, a shoe removing tool, means pivotally associated with said support, effective to actuate the tool and support same in operative relation to the last, and means initiating actuation of said member and tool whereby the tool is forced upwardly in engagement with the shoe to force the rear or heel portion of the shoe from the last mounted on said support.

26. In apparatus for removing boots or shoes from their lasts, the combination of a pedestal or support adapted to hold a last in an inverted position, a shoe removing tool, an actuating member connected thereto, and supporting same in the apparatus, means pivotally associated with said actuating member for operating said member and tool, said actuating member being connected to said support whereby to produce an arcuate movement of said tool through a path conforming substantially to the line of curvature of the heel portion of the last, under the influence of said operating means.

27. In apparatus for removing boots or shoes from their lasts, the combination of a pedestal or support adapted to hold a last in an inverted position, a shoe removing tool, an actuating member connected thereto, means pivotally associated therewith for operating said member and tool, rigid means pivotally connecting said actuating member to said support for producing an arcuate movement of said actuating member and tool, said actuating member and tool being supported independently of said pedestal, by said rigid means.

28. A machine for providing relative movement between a shoe and a last upon which the shoe is mounted, comprising a support for the last with a shoe thereon, a tool for effecting such relative movement between the shoe and last, having a portion shaped like a shoe horn, and adapted for insertion between the heel portion of the shoe and the last, means for supporting said tool and for moving said tool while in engagement with the shoe and the last to effect the relative movement between the shoe and last, said means comprising an actuating member connected to said tool and pivotally associated with said support, and means for initiating actuation of said member and tool.

29. A device for removing shoes from lasts, comprising a frame, last holding means on said frame, a lever mounted for oscillatory movement in said frame, an arm carried by said lever and cooperable with the heel portion of a shoe to remove it from a last, said arm being supported for free operative movement with respect to said frame, whereby it is uncontrolled by said frame during normal operating movements, and means for operating said lever to raise and lower said arm.

30. A device for removing shoes from lasts, comprising a frame, last holding means on said frame, an arm cooperable with a heel portion of a shoe to remove it from a last, a lever engaging said arm for supporting and actuating the same for movement relative to said frame, whereby it is uncontrolled by said frame during normal operating movements, and means for operating said lever to raise and lower said arm.

31. A device for removing shoes from lasts comprising a frame, last holding means on said frame, an arm independent of said frame and cooperable with a heel portion of a shoe to remove it from a last, a lever pivotally connected to said arm for supporting and actuating the same, means for operating said lever to raise and lower said arm, and means including said lever for producing an arcuate movement of said arm.

32. A device for removing shoes from lasts, comprising a frame, last holding means on said frame, a lever mounted on said frame for oscillatory movement, an arm cooperable with the heel portion of a shoe to remove it from a last, pivotally connected to and supported by said lever, whereby it is uncontrolled by said frame during normal operating movements, a treadle, and means connecting said treadle to said lever, for operating said arm.

33. A device for removing shoes from lasts, comprising a frame, last holding means on said frame, a lever mounted on said frame for oscillatory movement, an arm cooperable with the heel portion of a shoe to remove it from a last, pivotally connected to and supported by said lever, said arm and lever being so arranged relative to each other and to said frame as to produce an arcuate movement of said arm upon actuation thereof by said lever, a treadle, and means connecting said treadle to said lever, for actuation thereof.

CHARLES EDWARD ROWE.